(12) United States Patent
Conley et al.

(10) Patent No.: US 10,318,254 B2
(45) Date of Patent: Jun. 11, 2019

(54) INTEGRATING APPLICATION FEATURES INTO A PLATFORM INTERFACE BASED ON APPLICATION METADATA

(71) Applicant: Oracle International Corporation, Redwood Shores, CA (US)

(72) Inventors: Dylan Conley, Highland Park, IL (US); Benjamin Baker, Chicago, IL (US); Pavel Cherkashin, Deerfield, IL (US); Joshua Thorson, Chicago, IL (US); Joseph Campbell, Chicago, IL (US); Brian Korbein, Northlake, IL (US); Robert Lee Williams, III, Chicago, IL (US); Arthur Harrill, Evanston, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/790,259

(22) Filed: Oct. 23, 2017

(65) Prior Publication Data

US 2018/0217820 A1 Aug. 2, 2018

Related U.S. Application Data

(60) Provisional application No. 62/451,446, filed on Jan. 27, 2017, provisional application No. 62/451,459, filed on Jan. 27, 2017.

(51) Int. Cl.
*G06F 9/44* (2018.01)
*G06F 8/38* (2018.01)
(Continued)

(52) U.S. Cl.
CPC .................. *G06F 8/38* (2013.01); *G06F 8/20* (2013.01); *G06F 8/30* (2013.01)

(58) Field of Classification Search
CPC .................. G06F 8/30; G06F 8/38; G06F 8/20
(Continued)

(56) References Cited

U.S. PATENT DOCUMENTS

2007/0220035 A1* 9/2007 Misovski .................. G06F 8/38
2013/0055291 A1* 2/2013 Pierson ................. G06F 9/4484
719/328

(Continued)

*Primary Examiner* — John Q Chavis
(74) *Attorney, Agent, or Firm* — Invoke

(57) ABSTRACT

Techniques for configuring and generating an integrated application interface are disclosed. An interface for generating application metadata associating application components and component behaviors may be displayed to a user. The metadata generation interface accepts user input associating an action with an application component. The system generates application metadata, defining application behavior corresponding to the application component, based on the user input. The system may generate a platform interface that integrates the application behavior into a platform interface, based on the application metadata. The system determines behaviors of components of the application by analyzing the application metadata. Based on the application component behaviors, the system renders platform components of the platform interface to integrate the application behaviors into the platform interface. Upon receiving user input via the platform components of the platform interface, the system may construct and transmit a request to the application.

13 Claims, 12 Drawing Sheets

(51) Int. Cl.
*G06F 8/20* (2018.01)
*G06F 8/30* (2018.01)

(58) Field of Classification Search
USPC .......................................................... 717/107
See application file for complete search history.

(56) References Cited

U.S. PATENT DOCUMENTS

| | | | |
|---|---|---|---|
| 2015/0339107 A1* | 11/2015 | Krishnamurthy | G06F 8/34 717/107 |
| 2016/0070680 A1* | 3/2016 | Wagner | G06F 17/30861 715/234 |
| 2016/0154629 A1* | 6/2016 | Noens | G06F 8/30 717/107 |
| 2016/0188302 A1* | 6/2016 | Fredrick | G06F 8/34 717/107 |
| 2016/0306637 A1* | 10/2016 | Klemenz | G06F 9/451 |

* cited by examiner

INTEGRATING APPLICATION FEATURES INTO A PLATFORM INTERFACE BASED ON APPLICATION METADATA

BENEFIT CLAIMS; RELATED APPLICATIONS; INCORPORATION BY REFERENCE

This application claims the benefit of U.S. Provisional Patent Application No. 62/451,446, filed Jan. 27, 2017, and U.S. Provisional Patent Application No. 62/451,459, filed Jan. 27, 2017, which are hereby incorporated by reference.

TECHNICAL FIELD

The present disclosure relates to generating a platform interface. In particular, the present disclosure relates to integrating application behavior, associated with an application component of an application, into a platform interface.

BACKGROUND

Applications are computer programs that execute certain actions. For example, an application can manage a database or play media. An application may operate as a stand-alone function, or work in conjunction with additional applications. An application may execute on hardware such as desktop computers, tables, and phones. A distributed application may execute on multiple devices which may include both client and server components. The server component, executing an application, may execute in a public cloud. A client component, executing the application, may use one or more services provided by the public cloud.

A platform (as referred to herein) includes an application platform which integrates a set of packaged and/or custom applications. Conventional platforms may transfer control to each of the applications integrated by the platform. Conventional platforms may be similar to an operating system which transfers control to each of the applications executed by the operating system.

A platform interface may include a Graphical User Interface (GUI) presented by a platform that integrates applications. A platform interface displays information to a user and receives information from the user. A platform interface may include elements for receiving user input, such as radio buttons, text boxes, and scroll bars. As an example, a platform interface may include a button that allows a user to switch to one of the integrated applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 7A-7D illustrate platform and application interfaces in accordance with one or more embodiments.

DETAILED DESCRIPTION

Figure 1:
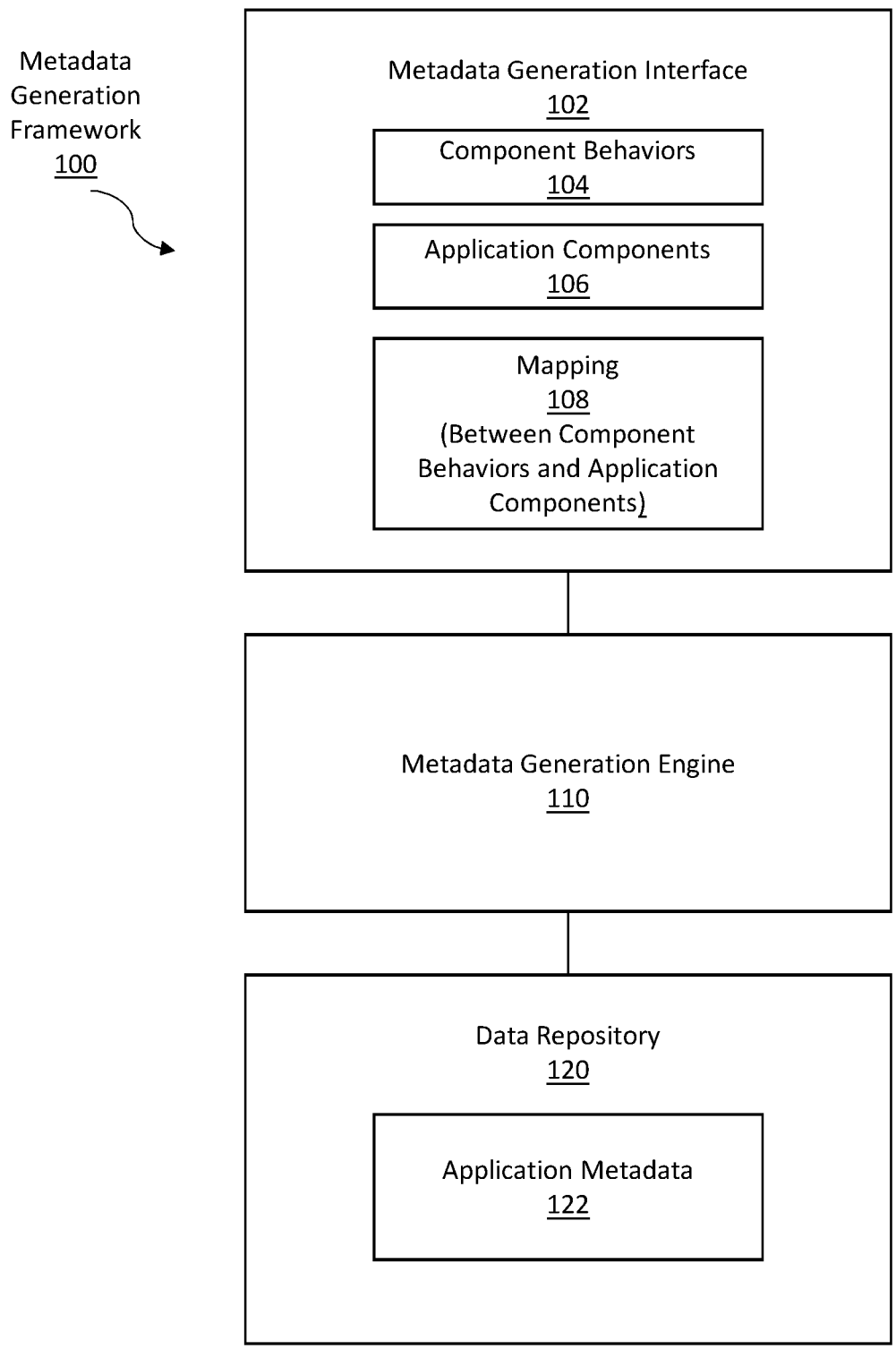
FIG. 1 illustrates a metadata generation framework in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. APPLICATION METADATA
   A. METADATA GENERATION FRAMEWORK
   B. GENERATING APPLICATION METADATA
   C. EXAMPLE EMBODIMENT
3. PLATFORM INTERFACE
   A. PLATFORM GENERATION FRAMEWORK
   B. INTEGRATING APPLICATION BEHAVIOR IN A PLATFORM INTERFACE
   C. PHASED RENDERING
   D. EXAMPLE EMBODIMENT
4. MISCELLANEOUS; EXTENSIONS
5. HARDWARE OVERVIEW

1. General Overview

One or more embodiments include generating application metadata that indicates the behavior of an application (referred to herein as "application behavior"). Application behavior is defined by a set of one or more actions corresponding to the components of the application. Examples of such actions may include but are not limited to a local save operation, a remote backup operation, a transform operation, a delete operation, an overwrite operation, and a data transfer operation. Application components may include Graphical User Interface (GUI) components such as, for example, buttons, fields, checkboxes, and radio buttons. Application components may include application endpoints or Application Programming Interface (API) methods configured to receive input. A metadata generation engine presents an interface which accepts user input for associating an action with a component of an application. Based on the user input, the metadata generation engine generates metadata indicating a relationship between the action and the application component. As an example, the metadata generation engine presents, via the interface, a set of candidate actions that may be associated with a particular button comprised in an application interface. The metadata generation engine receives user input selecting a "local save operation", from the candidate set of operations, for association with the particular button. The metadata generation engine generates metadata indicating that the "local save operation" is performed in response to selection of the particular button.

In an embodiment, the metadata generation engine presents a limited set of candidate actions and a limited set of application components to solicit user-defined relationships. The metadata generation engine may analyze the functionality of a platform to identify actions that may be performed by the platform. The metadata generation engine presents actions, that may be performed by the platform, as a limited set of candidate actions that may be associated with one of a set of application components. The metadata generation engine may present actions that either the application or the application platform may perform. The metadata generation engine may present application components, for association with an action, based on an analysis of a particular third-party application. The metadata generation engine analyzes the particular third-party application to identify application components corresponding to the particular third-party application. The metadata generation engine may present the applications components, corresponding to the particular third-party application, as a set of candidate application components which may be associated with a candidate action.

One or more embodiments include generating an application platform based on application metadata. The application platform integrates application behavior, of a third-party application, that is identified by the application metadata. The platform generator determines the application behavior of the third-party application based on the application metadata generated by the metadata generation engine. Specifically, the platform generator determines the action(s) corresponding to various application components of the third-party application. The platform generator may generate a platform interface that both (a) incorporates a behavior of a third-party application and (b) retains a look-and-feel of the platform interface.

As an example, a platform generator generates a platform that integrates the behavior of a music streaming application. The platform generator analyzes metadata associated with the music streaming application to determine the behavior of the music streaming application. The platform generator may determine, for example, that a "play" button of the third-party application is used to initiate the streaming of music. The platform generator generates a platform with a platform interface that includes a "play" button. The "play" button (a) can be selected to initiate the streaming of music and (b) looks similar in color, style, and size to other buttons of the platform interface. The platform generator may configure the platform to transmit, to the music streaming application, a command to stream music in response to detecting selection of the "play" button on the platform interface.

2. Application Metadata

A. Metadata Generation Framework

FIG. 1 illustrates a metadata generation framework 100 in accordance with one or more embodiments. The metadata generation framework 100 generates application metadata 122 using a mapping 108 between component behaviors 104 and application components 106. As illustrated in FIG. 1, the metadata generation framework 100 includes a metadata generation interface 102, a metadata generation engine 110, and a data repository 120. In one or more embodiments, the metadata generation framework 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, application components 106 correspond to any components of an application to be integrated into an application platform. The application may be referred to herein as an "integrated application". Application components 106 may include Graphical User Interface (GUI) components of a GUI interface of the application. Application components 106 may include, but are not limited to buttons, drop-down menus, radio boxes, tabs, embedded videos, scroll bars, and text boxes. Application components may or may not allow for user input. Interactive application components include buttons, tabs, and editable fields. Non-interactive application components include non-editable fields displaying information about a record, and a header displaying information about the application. Application components 106 may include non-graphical end-points, of the application, which accept commands to be executed by the application. Application components may include instantiated objects which may accept and execute commands.

In an embodiment, an application is associated with a behavior. A behavior of an application, as referred to herein, includes actions corresponding to the components of the application. An action corresponding to a component may be, for example, an action that is performed in response to selection of the component. An action corresponding to a component may be, for example, an action that is performed in response to a particular command received by or via the component. An action corresponding to a component may be referred to herein as a component behavior 104. Accordingly, the behavior of an application is defined by a set of application behaviors corresponding to application components. As an example, a button is an application component of a user interface. The button may be associated with an action (component behavior) that is to be executed when clicking of the button is detected. A particular application component 106 may be associated with a series of component behaviors, or "action steps." As an example, when a user clicks a button labeled "download song," a request to retrieve the song is transmitted to a server, subscription information is verified, and the song is streamed to the user's device. Another example of a component behavior includes a processing operation for acknowledging receipt of a request. Another example of a component behavior includes a saving operation for saving a customer profile.

In an embodiment, mapping 108 associates a particular application component 106 with one or more component behaviors 104. A mapping 108 may map an application component 106 to a corresponding component behavior 104. A mapping 108 may map an application component 106 to a series of component behaviors 104 defining an action. As an example, a button, labeled Save, is mapped to a Save action. Responsive to detecting a click of the Save button, the system causes execution of a series of action steps for completing the Save action.

In an embodiment, application metadata 122 describes component behaviors 104, application components 106, and relationships thereof. Application metadata 122 may describe the look and feel of an application interface. As an example, application metadata 122 indicates a label for a button on an application interface. As another example, application metadata 122 may specify a location at which data is to be saved when a user clicks a button labeled "save." Application metadata 122 may specify how many buttons to display on a page.

Application metadata 122 may be based on user input which specifies the mapping 108 between component behaviors 104 and application components 106. As an example, application metadata 122 identifies field data that is to be saved in response to detecting the clicking of a save button. As another example, application metadata 122 associates a step to be executed with a call to an endpoint, such as a Representational State Transfer (REST) application programming interface (API) endpoint. As another example, application metadata specifies that a user interface of an application has a bar of six tabs along the top, a text box below the bar of tabs, and four buttons below the text box.

In an embodiment, the application metadata 122 associates an application component 106 with an action. As an example, the application metadata 122 may associate a command with a request for updating a data set or a request for querying a data set. As an example, a "save" button is an application component on a user interface. The application metadata associates the "save" button with a series of actions. The series of actions may include transmitting data to an external application that is configured to save received data. The application metadata 122 may further associate the "save" button with steps in which the system saves information locally, saves data updates to an external application system, saves a list of items, or loads updates. The application metadata 122 for the save action may further include information defining the order in which sub-steps of the save action are to be executed.

In one or more embodiments, the metadata generation engine 110 generates application metadata 122 to be stored in data repository 120. The metadata generation engine 110 receives information from metadata generation interface 102. The received information may describe a series of actions to be executed, sub-steps in each action, the order in which to execute the actions, and details about the sub-steps such as an endpoint identifying location to be used during execution. The metadata generation engine 110 generates application metadata 122 describing the actions to be executed, the order in which to execute the actions, and details about the respective steps. The metadata generation engine 110 includes functionality to analyze the mapping 108 between component behaviors 104 and application components 106. The metadata generation engine 110 generates the application metadata 122 based on the analysis of the mapping 108. In an embodiment, the metadata generation engine 110 may retrieve information about a third-party application by communicating with the third-party application. The metadata generation engine 110 may include the retrieved information in the application metadata 122.

In one or more embodiments, the data repository 120 is any type of storage unit and/or device (e.g., a file system, database, collection of tables, or any storage mechanism) for storing data. Further, the data repository 120 may include multiple different storage units and/or devices. The multiple different storage units and/or devices may or may not be of the same type or located at the same physical site. Furthermore, the data repository 120 may be implemented or may execute on the same computing system as the metadata generation interface 102 and the metadata generation engine 110. Alternatively, or additionally, the data repository 120 may be implemented or executed on a computing system separate from the metadata generation interface 102 and the metadata generation engine 110. The data repository 120 may be communicatively coupled to the metadata generation interface 102 and the metadata generation engine 110 via direct connection or via a network.

In one or more embodiments, the metadata generation interface 102 is a User Interface (UI) that accepts user input for selecting a mapping 108 between component behaviors 104 and application components 106. The metadata generation interface 102 may be, for example, a graphical user interface (GUI). In an embodiment, the metadata generation interface 102 includes functionality to accept user input through a series of text entry fields, buttons, drop-down-menus, and/or checkboxes. As an example, the metadata generation interface 102 lists each of a set of application components corresponding to an application with selectable checkboxes. As another example, the metadata generation interface 102 receives, through text entry fields, an order in which to execute a series of actions, along with details about the actions such as a callout Uniform Resource Locator (URL) and result handling instructions.

B. Generating Application Metadata

Figure 2:
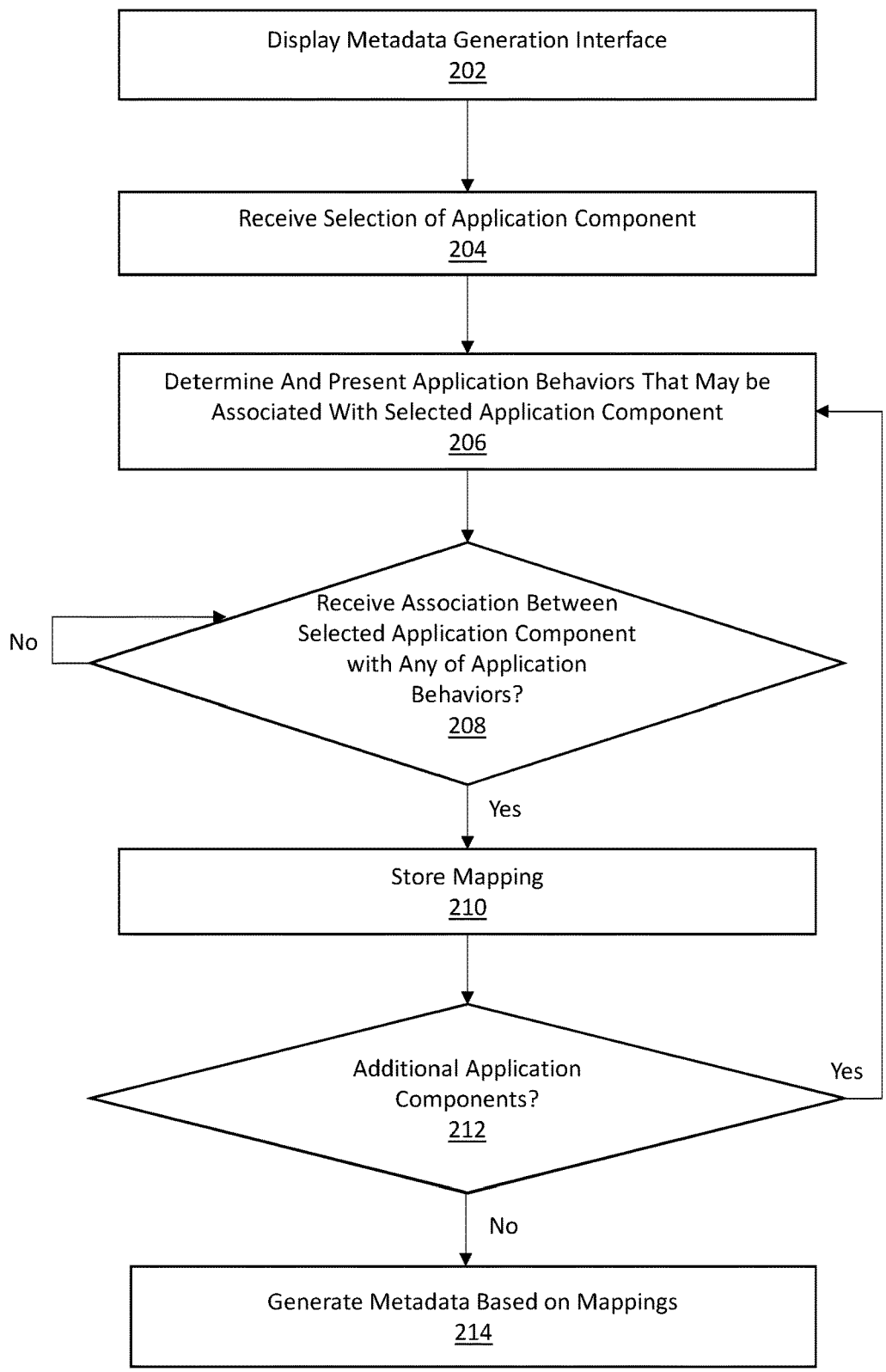
FIG. 2 illustrates an example set of operations for generating metadata.

FIG. 2 illustrates an example set of operations for generating application metadata, in accordance with one or more embodiments. In an embodiment, the metadata generation framework generates application metadata based upon mappings between application components and component behaviors. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the metadata generation framework displays the metadata generation interface (Operation 202). The metadata generation framework may display the metadata generation interface upon receiving a request to configure an application component and/or component behavior. The metadata generation framework may render elements of the metadata generation interface for configuring application components and component behaviors, as described in Section 2A.

In an embodiment, the metadata generation framework receives selection of application components (Operation 204). The metadata generation interface may receive a selection of an application component, from a list of candidate application components displayed by the metadata generation interface. As an example, the metadata generation interface lists a set of candidate application interface components in a drop-down menu. The metadata generation interface receives user input selecting a particular application interface component. The candidate set of application components may be application components that were identified via an analysis of the application interface.

The system may receive text input, via a user-modifiable field. The text input may be matched to a candidate set of application components. As an example, the metadata generation interface may receive the text input "button group." The metadata generation interface may determine whether an application component submitted by a user via a text field is found within the candidate set of application components. If the application component submitted by the user is not found within the candidate set of application components, then the metadata generation interface may display an error or warning. The warning may indicate that no such application component exists. Alternatively, or additionally, the text input may configure a selected application component. As an example, a user has selected to include a button. The user enters, via text input, the word "save," to be rendered on the button.

In an embodiment, the metadata generation framework determines and presents component behaviors that may be associated with the selected application component (Operation 206). As an example, the metadata generation framework may determine the candidate set of actions (component behaviors) that may be configured for execution in response to selection of a particular button (selected application interface component). Alternatively, or in addition, a default set of component behaviors may be presented for selection. Presenting a default set of component behaviors may not necessarily involve determining component behaviors that may be associated with the selected application component as illustrated in Operation 206. As described above, the component behaviors may include, for example, loading data, saving data, transforming data from one format to another, calling out to a REST API, or playing a video.

In an embodiment, the metadata generation framework receives an association between the selected application component and one or more component behaviors (Operation 208). The metadata generation framework may accept user input associating a component and one or more component behaviors via graphical elements of the metadata generation interface such as drop-down menus and/or text entry fields. As an example, the metadata generation framework receives an association between an application component and a component behavior as a set of two inputs. The set of two inputs are received via a related set of selectors. The first input selects a particular application component from an application component selector. The second input selects a particular action from an action selector that is associated with the component selector.

The metadata generation interface may receive user input describing the order in which to execute a subset of actions associated with a selected component of the application interface. As an example, the selected application interface component is a button labeled "save." User input specifies an action, a local save, which is associated with the button. When the "save" button is clicked, a local save operation is to be executed for the currently displayed record. Furthermore, a synchronization operation is to be executed to backup locally saved data to cloud storage. Other examples of system behaviors include performing data transformations, storing data to a particular location, or calling a REST API function.

As another example, the following interface displays fillable fields to receive, from user input, a series of action steps involved in saving data in response to selection of a "save" button:

execute an action may also be received via the metadata generation interface. For example, a callout URL may be specified when the type of action is a callout.

In an embodiment, the metadata generation framework stores a mapping between application components and component behaviors (Operation 210). The mapping associates a particular application component with one or more component behaviors as specified in the received user input. Storing the mapping may include storing a table. An application interface component may be stored in a first field of each row. One or more component behaviors mapped to the application interface component may be stored in additional fields of the same row.

In an embodiment, the metadata generation framework determines whether additional application components are selected (Operation 212). The metadata generation interface may permit a user to select additional application components, e.g., via a button labeled "Add Component." The metadata generation interface may permit a user to select to stop adding application components, e.g., via a button labeled "Done."

If the metadata generation framework receives instructions to configure additional application components, then steps 206-210 are repeated. The metadata generation framework may present the application interface components and prompt the user to select component behaviors corresponding to the additional application components. Alternatively, or additionally, the metadata generation framework may select component behaviors based on past use of the application components.

In an embodiment, the metadata generation framework generates metadata based on the mapping between each application component and respective component behavior(s) (Operation 214). Generating the metadata may include generating a parsable file which lists each application component and respective component behaviors. Generating the metadata may include populating a metadata template form with application components and respective component behaviors. Generating the metadata may include specifying which component behaviors are required and which component behaviors are optional in relation to an application interface component. As an example, the metadata may specify whether or not the tabs in an application interface may or may not be temporarily collapsed.

C. Example Embodiment

A detailed example is described below for purposes of clarity. Components and/or operations described below should be understood as one specific example which may not be applicable to certain embodiments. Accordingly,

| Order | Type | Pre-transform | Callout URL | Endpoint | Post-transform |
|---|---|---|---|---|---|
| 0 | Transform | Application A Data Prep | | | |
| 1 | Callout | Pre Save | Application A | Save Transaction Target | Post Save |
| 2 | Local Save | Save OQ Data Cache | | | |

The metadata generation interface receives user input specifying three actions to be executed in response to selection of the save button. The actions include a transform, a callout, and a local save. Additional information necessary to components and/or operations described below should not be construed as limiting the scope of any of the claims.

Figure 3A:
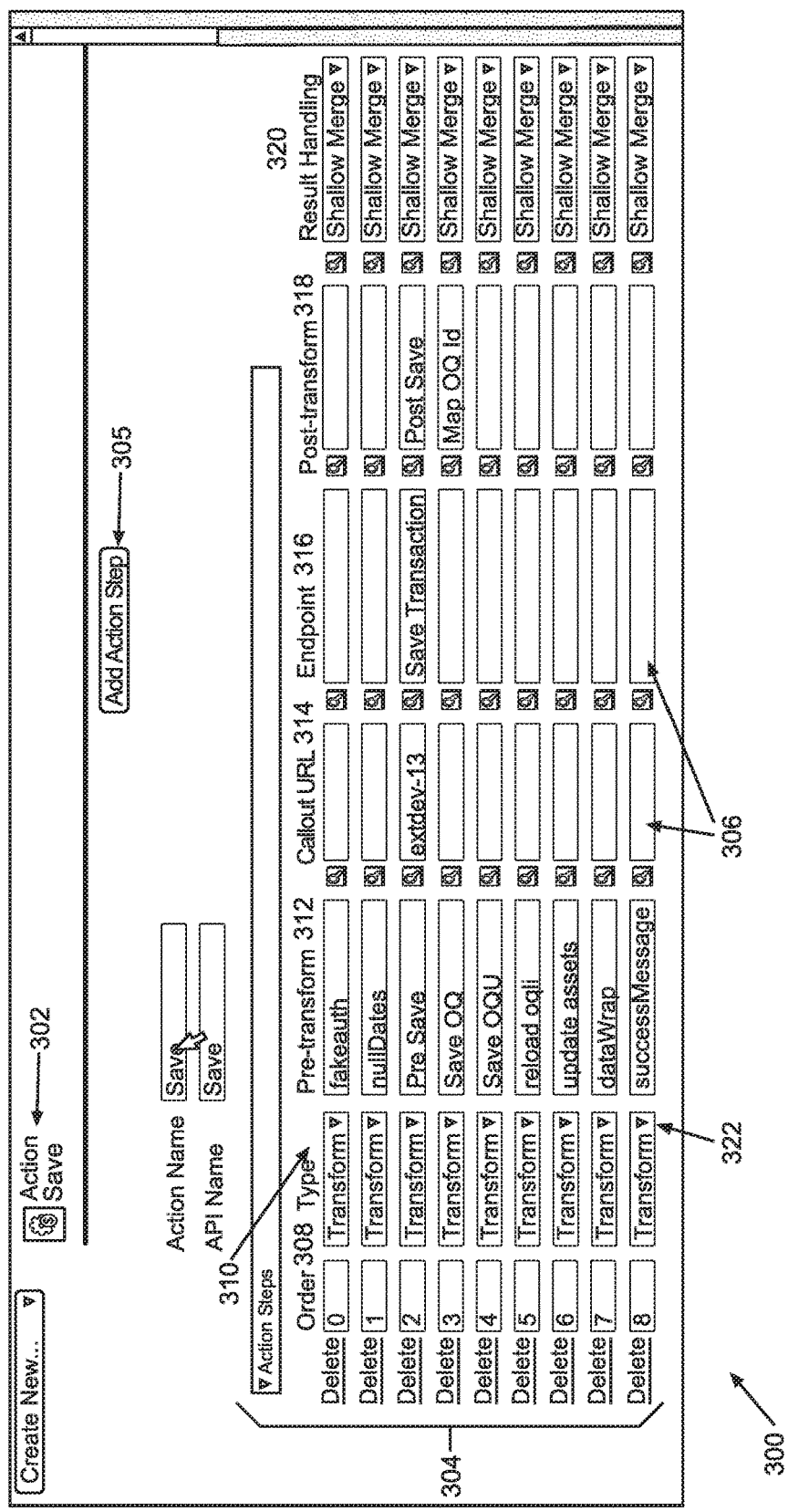
FIGS. 3A-3C illustrate an example metadata generation interface in accordance with one or more embodiments.

FIG. 3A illustrates a metadata generation interface 300 in accordance with one or more embodiments. The metadata generation interface 300 displays elements to accept user input defining component behaviors associated with a particular application component.

The metadata generation interface 300 includes a heading 302, specifying a component behavior being configured. The component behavior being configured is Save. Save includes a series of action steps 304 corresponding to a Save button. The Save button is an application component to be displayed via a user interface (e.g. platform interface 420, described in Section 3). The Save button is configured to save data to an external application (e.g. third-party application 430, described in Section 3). Using the metadata generation interface 300, a user can configure what happens when the Save button is clicked.

The Save button is associated with a set of action steps 304. The metadata generation interface includes an "Add Action Step" button 305. Responsive to detecting user interaction with the button 305, the metadata generation interface adds an action step 304 to the displayed list of action steps. In this case, 9 action steps 304 are displayed, numbered 0-8.

For each action step, the metadata generation interface 300 displays six columns (308-320). The columns include graphical elements for accepting user input to configure features of the action steps. The graphical elements include user-modifiable fields 306 and drop-down menus 322. Via the user-modifiable fields 306 and the drop-down menus 322, the metadata generation interface can accept user input defining each of the action steps 304.

The Order column 308 may be used to establish the order in which the action steps are executed. In this case, the action steps are to be executed in the order listed. Upon detecting that a user has activated the Save button, the system will cause action steps 0-8 to be executed sequentially.

Figures 3B, 3C:
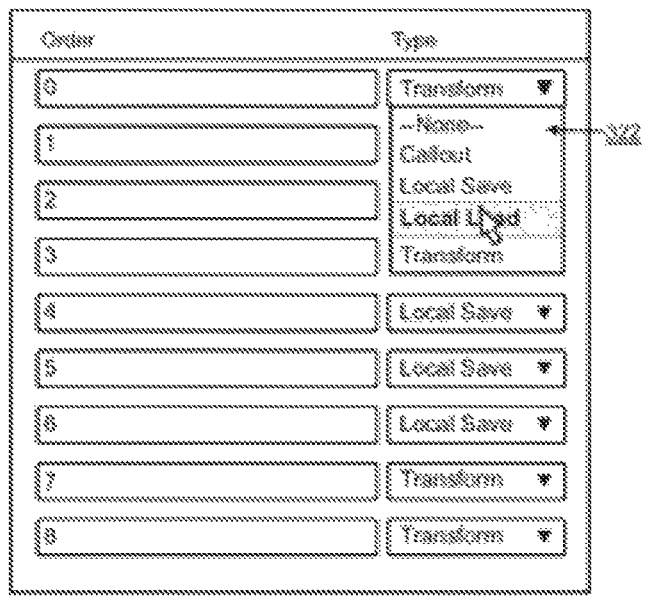

The Type column 310 may be used to establish a type of action step. The type of action step can be selected using a drop-down menu 322 (as shown in FIG. 3B). The action steps may be designated as one of four types. The drop-down menu presents the options None, Callout, Local Save, Local Load, and Transform. An action step of type Callout executes REST callouts to a server to retrieve data. An action step of type Local Load loads data from the local platform. An action step of type Local Save saves data locally. An action step of type Transform transforms data. Data may be transformed before transmitting the data to an external application (pre-transform). Data may be transformed before returning the data to the local platform (post-transform). Allowing a user to select a type of action step can make selecting additional parameters for the action step a more user-friendly process. Based on the action step type, one or more suggested parameters may be selectable for the remaining fields defining the action step.

The Pre-transform column 312 may be used to select a pre-transform operation. A pre-transform operation transforms data associated with a local platform into a format understandable by a third-party application. The data to be transformed may be the output from a previous action step. Alternatively, or additionally, the data to be transformed may be received via user input. As an example, a user may enter a string of text to store in association with a particular field.

A pre-transform may involve adding or removing portions of a data set, to transform the data set into a format interpretable by the third-party application. In the first action step illustrated in FIG. 3A, the user has entered the pre-transform "fakeauth." Fakeauth is a transform that appends information to the data to transform the data into a format interpretable by the third-party application to which the data will be transmitted. The third action step illustrated in FIG. 3A includes a Pre Save transform. The Pre Save transform constructs a replacement set of data, by copying source data and excluding selected pieces of information that the destination application cannot handle. The Pre Save transform removes components from the data set, and saves a new data set to pass to the destination application API.

The Callout URL column 314 may be used to select a callout URL. The callout URL is a base URL of an endpoint to call. The callout URL may be used to identify one or more web services to be used for executing a particular operation. As an example, for the Save action, the callout URL specifies an URL to call for saving the data. The callout URL may broadly specify a web service to call, with details specified using the endpoint 316.

The Endpoint column 316 may be used to select an endpoint. Together, the callout URL and endpoint specify a path for directing a request. As an example, the Callout URL is "bigdatastore.com." The endpoint is/savetocloud. Together the callout URL and the endpoint specify an API endpoint to call to save the data upon detecting user interaction with the Save button. FIG. 3C illustrates an example endpoint 324, "Save Transaction." The endpoint specifies a path 326 defining an API endpoint. The request type 328 is post. When the system detects user interaction with the Save button, the system makes a post request to the endpoint 324, to save data via the third-party application.

Referring to FIG. 3A, the Post-transform column 318 can be used to select a post-transform. The post-transform is used to covert data received from the third-party application back to a format interpretable by the platform. As described with respect to a pre-transform 312, a post-transform may involve adding or removing components from a data set.

The Result Handling column 320 may be used to select a data merging method. For each action step, the metadata generation interface presents a drop-down menu. Using the drop-down menu, a user can select "Shallow Merge," "Use Original," or "Use Current." Typically, after executing the operations associated with an action step, the system will have two data sets—the data prior to the action step execution and the data subsequent to the action step execution. The result handling type defines how to handle the two data sources. If Shallow Merge is selected, then the two data sources will be merged. If Use Original is selected, then the original data will be used and the updated data will be discarded. If Use Current is selected, then the updated data will be used and the original data will be discarded. Using a data set may comprise saving the data set and/or using the data set to execute an operation.

Upon detecting that the user has completed configuring the action steps of the Save action, the system generates application metadata. The application metadata corresponds to the operations that are executed when user interaction with the Save button is detected. The metadata describes the transformations, endpoints, and result handling methods specified via the metadata generation interface.

3. Platform Interface

A. Platform Generation Framework

Figure 4:
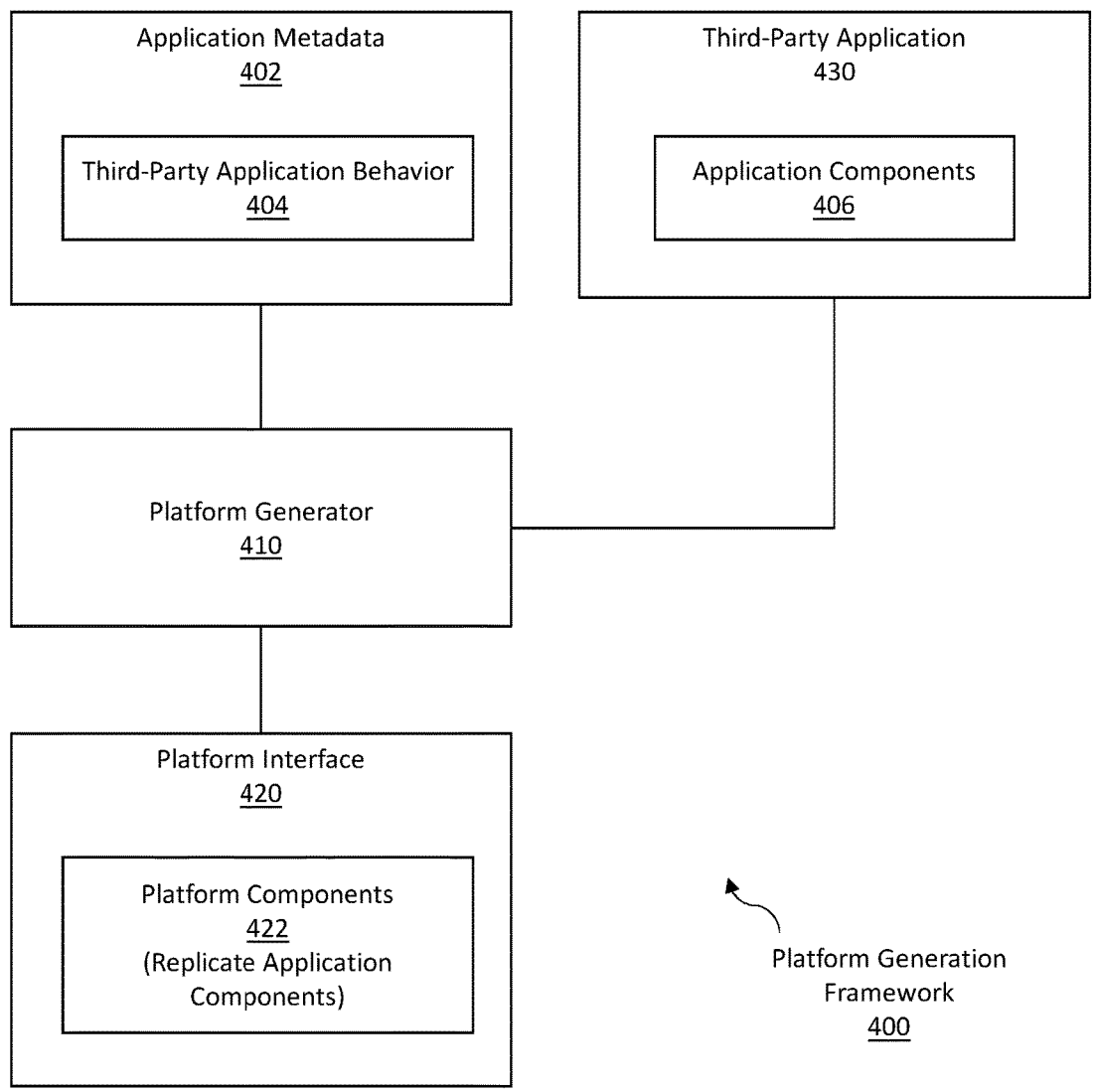
FIG. 4 illustrates a platform generation framework in accordance with one or more embodiments.

FIG. 4 illustrates a platform generation framework 400 in accordance with one or more embodiments. The platform generation framework 400 integrates third-party application behavior 404 of a third-party application 430 into a platform interface 420. As illustrated in FIG. 3, the platform generation framework 400 includes application metadata 402, a platform generator 410, a platform interface 420, and a third-party application 430. In one or more embodiments, the platform generation framework 400 may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component.

In one or more embodiments, the third-party application 430 is an application that provides services to a platform. As an example, the third-party application 430 is invoked by the platform to generate and manage sales quotes. The platform may submit requests to the third-party application to store sales information. The platform may query the third-party application to obtain a sales quote. As another example, the platform displays a platform interface 420 including an embedded video. The platform may query the third-party application 430 for a stream corresponding to the embedded video.

In an embodiment, application components 406 include application interface components of an application interface corresponding to the third-party application 430. A user may submit input or obtain information via application components 406. Application components 406 are similar to application components 106 described above.

Application metadata 402 includes metadata which describes third-party application behavior 404. Application metadata 402 is similar to application metadata 122 described above.

Third-party application behavior 404 includes any behavior characterizing the third-party application and/or the components of the third-party application. Third-party application behavior may be defined as a set of component behaviors (e.g., component behavior 104) described in relation to respective application components 406. For example, third-party application behavior 404 may indicate that the third-party application 430 loads a quote in response to detecting that a user has clicked a "load quote" button in a corresponding application interface. As another example, third-party application behavior 404 may indicate that the third-party application 430 performs a call to a REST API as a step in a data saving operation. Another example, the third-party application behavior 404 may indicate that the third-party application posts a photo to social media in response to determining that a user has clicked an "upload" button in a corresponding application interface.

In an embodiment, the platform interface 420 is a User Interface (UI) for a platform which integrates third-party applications. The platform interface 420 may include a Graphical User Interface (GUI). The GUI may include buttons, fields, check boxes, drop down menus, and other graphical components. A user may interact with the graphical components of the GUI to obtain information or provide input.

In an embodiment, the platform interface 420 includes platform components 422 which mimic at least a portion of the third-party application behavior 404 specified by the application metadata 402. The platform components 422 may include elements of the platform's user interface, such as buttons, tabs, sliders, and drop-down menus. Platform components 422 are generated to replicate third-party application behaviors 404 of the third-party application 430. For example, a platform component may correspond to a "save" button which is associated with the same operation as a "save" button in the original application interface of the third-party application.

The platform interface 420 may be controlled and executed by the platform itself. Input received via the platform interface 420 is processed by the platform. The platform may be implemented such that the platform performs operations responsive to user input. For example, the platform may display a set of tabs which mimic tabs within the original application interface of the third-party application. In response to receiving a selection of one of the tabs, the platform interface may display content corresponding to the selected tab. The platform interface need not communicate with the third-party application for determining whether to the display content corresponding to the selected tab. The platform interface may be generated to mimic the application behavior of the third-party application based on the application metadata 402.

Alternatively, the platform may be implemented such that the platform transmits instructions or requests to a third-party application based on at least a partial processing of the user input. As an example, the user input, received by a platform interface, may correspond to a query for information. The user input is received via a search field of the platform interface which (a) accepts the same queries as a search field of a third-party application and (b) matches a style corresponding to the platform. The platform interface submits the user input to a back-end platform process. The back-end platform process determines that the user input includes a query. The back-end platform process generates a query in a format interpretable by a third-party application. The back-end platform process transmits the query to the third-party application to obtain a set of search results from the third-party application. The platform interface then displays the search results received from the third-party application.

In an embodiment, platform generator 410 includes hardware and/or software configured for generating the platform interface 420. The platform generator 410 generates the platform interface 420 based on the application metadata 402 and the platform characteristics (not illustrated). Generating a platform interface 420 may include rendering platform components 422 such as a background field, buttons, tabs, sliders, and text. Generating a platform interface 420 may further include associating actions with the rendered components, such as saving data when a "save" button (platform interface component) is clicked. For example, a platform interface 420 displays a video. The platform generator 410 renders a background, a search bar, and an embedded video player, including buttons to play and pause. On the back end, the platform generator 410 also defines actions to execute when the platform interface 420 receives instructions from a user. For example, when the system receives notification that a user has clicked a "play" button, the platform requests a corresponding video stream from a server.

B. Integrating Application Behavior in a Platform Interface

Figure 5:
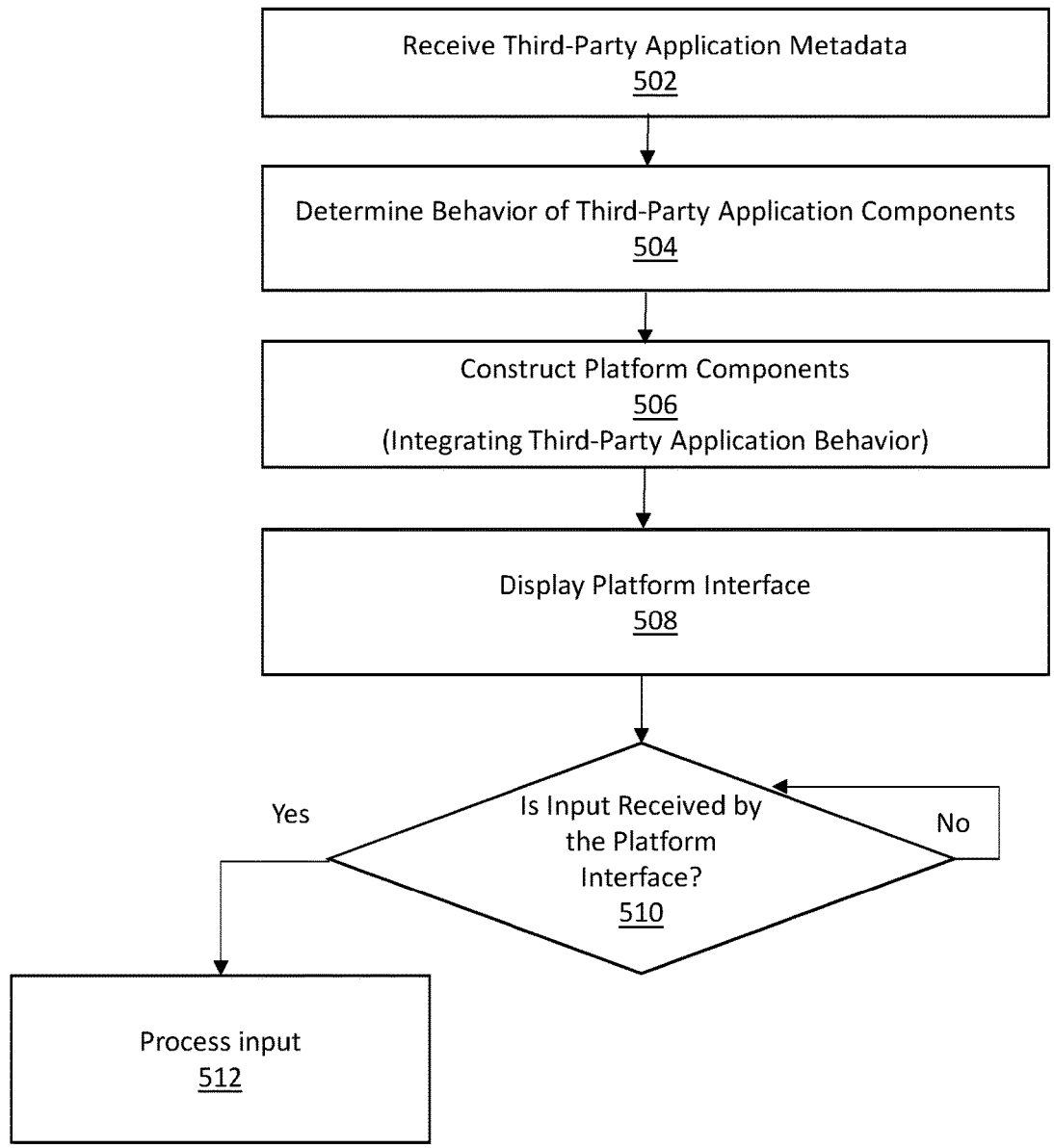
FIG. 5 illustrates an example set of operations for integrating application behavior in a platform interface.

FIG. 5 illustrates an example set of operations for integrating application behavior in a platform interface, in accordance with one or more embodiments. One or more operations illustrated in FIG. 5 may be modified, rearranged, or omitted altogether. Accordingly, the particular sequence of operations illustrated in FIG. 5 should not be construed as limiting the scope of one or more embodiments.

In an embodiment, the platform generation framework receives third-party application metadata (Operation 502). The platform generation framework may receive the third-party application metadata via a pull or push operation. A pull operation to retrieve the third-party application metadata may be executed in response to receiving instructions from a user to generate or update a platform interface which replicates the behavior of the third-party application. As an example, a user uses a Customer Relationship Management (CRM) platform which displays sales information corresponding to different customers on a platform interface. The user then selects, via the platform interface, an advertisement application used for transmitting advertisements to customers. The platform generation framework requests and obtains application metadata corresponding to the advertisement application. The application metadata describes the application interface of the advertisement application. Specifically, the application metadata describes the application interface components and the corresponding component behavior for each application interface component.

In an embodiment, the platform generation framework determines the behavior of third-party application components based on the application metadata (Operation 504). As an example, the platform generation framework parses an application metadata file to identify each application component defined by the application metadata file. The platform generation framework further identifies each component behavior(s) stored in relation to the application component within the application metadata file. The platform generation framework may determine a behavior and/or action of the platform that matches or is closest to the behavior of the third-party application components. As an example, the application metadata may specify that the third-party application includes a random digit generator which generates a random digit between 1 and 9. The platform generation framework may identify the same function, used by the third-party application, if the function is available in an API accessible to the platform. Alternatively, the platform generation framework may identify a different function, in an API accessible to the platform, which can be used to generate a random digit between 1 and 9. Alternatively, the platform generation framework may identify a random number generator functionality of platform. The random number generator may execute locally without communication with an external API.

In an embodiment, the platform generator constructs platform components which integrate third-party application behavior (Operation 506). The platform generator constructs the platform components using a native library of tools defined for the platform interface. The platform generator may update an existing platform interface by adding new platform components. The platform generator may generate platform components which match the look and/or feel of other existing platform components. The platform generation may generate an altogether new platform interface with the new platform components.

The platform generator may integrate third-party application behavior by generating platform components that mimic at least a portion of the behavior of the application interface components of the original third-party application interface. Generating the platform components may include conversion or adaptation of a type of the application interface components. Generating the platform components may include modifying a functionality associated with an application interface component.

In an embodiment, the platform generator replicates some aspects of the third-party application behavior without modification, while modifying other aspects of the third-party application behavior, based on the behavior of the native platform. For example, a third-party application interface concurrently displays six buttons. A platform interface replicates the six buttons from the third-party application interface with six buttons in accordance with a style of the platform interface. However, the platform interface design policies limit concurrent button display to three buttons. Accordingly, the platform interface concurrently displays up to three of the six buttons with the remaining buttons being accessed by executing a scrolling function.

In an embodiment, the platform generator generates platform components which communicate directly with back-end platform processes. The back-end platform processes execute operations corresponding to the platform components. The back-end platform processes communicate with the third-party application on an as-needed basis. For example, the back-end platform processes may communicate with the third-party application when data is needed from a database managed by the third-party application.

In an embodiment, the platform generator defines actions to be executed by the platform in response to a detecting user interaction with the platform components. The platform generator defines actions which mimic the application behavior of the third-party application. For actions that cannot be mimicked (e.g., accessing a back-end database that is only accessible to the third-party application), the platform may be configured to communicate the request to the third-party application to execute the action.

In an embodiment, the platform generation framework displays the platform interface which integrates third party application behavior (Operation 508). The platform interface is rendered, displaying the platform components that integrate third-party application behavior. In an embodiment, a particular view in the platform is associated with a set of actions that source data from the third-party application. The platform components may be configured to associate the results of system and user interaction with the third-party application. The platform generator provides instructions dictating what action is to be executed when a particular platform component is activated. The platform may, based upon actions executed in platform interface, communicate with the third-party application, and modify the platform interface accordingly.

In an embodiment, the platform generator renders a modal. The modal may, for example, be a pop-up window displayed over the overlay. In an embodiment, the platform generator recursively renders a secondary platform interface, in whole or in part, within the modal. The secondary platform interface includes the components and behaviors of the primary platform interface. The secondary platform interface has the same abilities of the primary platform interface. Alternatively, the secondary platform interface may be rendered with different components and behaviors from primary platform interface. For example, the primary platform interface incorporates third-party application behaviors, while the secondary platform interface does not. As another example, the primary platform interface does not incorporate third-party application behavior, but the secondary platform interface does incorporate third-party application behavior.

In an embodiment, the platform generator constructs the platform interface by rendering the third-party application interface directly within the platform interface. The platform generator renders the platform interface, to include the third-party application interface, in whole or in part. For example, the third-party application is a map. The platform generator renders the platform interface, embedding the third-party map, and the functionality of the map, within the platform interface. Rendering the third-party application interface within the platform interface may be done in conjunction with rendering additional platform components.

In an embodiment, the platform interface includes both platform components that trigger actions by the native platform, and platform components that trigger actions by the third-party application. Alternatively, or additionally, the platform interface may include one or more platform components that trigger actions both in the third-party application and in the native platform. As an example, the platform generator renders a platform interface, including a button with the label "add line item." The platform generator associates an action, of the third-party application, with the "add line item" button. The platform generator further associates an action, of the platform, with the "add line item" button. When the platform receives notification that a user has clicked the "add line item" button, the platform (a) prompts the third-party application to create a line item, and (b) displays the line item in a list on the platform interface.

In an embodiment, the platform interface may receive input (Operation 510). The platform may receive input based on user interaction with one or more components of the platform interface. As an example, the user clicks on a button. As another example, a user enters text into a user-modifiable field displayed via the platform interface.

If the platform interface receives input, then the platform generation framework processes the input (Operation 512). The platform generation framework may cause one or more operations to be executed, based on the received input. The platform generation framework may cause operations to be executed by the native platform. As an example, data is saved locally. The platform generation framework may cause operations to be executed by the third-party application. As an example, a song is downloaded from a server of the third-party application.

In an embodiment, the system may receive a response from the third-party application. The system may extract information from the received response. The system may display the extracted information via platform components of the platform interface. As an example, the system detects user interaction with a Load button. The system loads a data set from the third-party application. The system filters out a subset of the data set. The system displays the subset of data to the platform interface.

In an embodiment, the system binds Input/Output (I/O) of a platform component to a data set corresponding to a respective application component. A platform component and/or application component may be associated with metadata including bound data. The bound data may be adjusted by retrieving a data set specifying parameters associated with the bound data. As an example, when the system detects user interaction with a "Play" button, a call to an API endpoint is executed. The call includes the bound data element filename. The platform interface receives the file name My Song via user interaction with the platform interface. Based on the specified file name, the system executes a call to the API, replacing the filename bound data element with the filename My Song. The system plays the specified song.

In an embodiment, platform generator generates platform components that mimic some behavior of application components, while modifying some behavior of the application components. The platform generator may modify a portion of an application component behavior based on restrictions of the native platform. The platform generator may generate platform components to replicate third-party behavior to the extent allowed by the specification of the native platform. A platform component may replicate a behavior of an application component, but in a modified form. As an example, in the third-party application interface, interaction with a particular button results in navigation to a new page. In the integrated application, interaction with the same button triggers a pop-up window in the platform interface.

In an embodiment, the platform generator may modify a portion of the third-party application behavior to the extent that modification is restricted in the native platform application. As an example, the platform generator receives metadata related to third-party application behavior. The application metadata specifies that the application does not allow a user to delete an item. Additionally, the platform generator receives metadata related to platform components of the platform. The platform metadata specifies that the platform interface includes a platform component, a "delete item" button. The platform generator modifies functionality by removing the "delete item" button from the platform interface.

In an embodiment, the system transforms data from one format to another. As an example, the metadata generation engine translates data from a format interpretable by the third-party application to a format interpretable by the native platform. The receipt of instructions based on user interaction with the platform interface may trigger a translation, followed by changes to the platform interface. The changes to the platform interface may include including navigation to a new page, display of modal dialog, alteration of elements on the page, and page change of a paginated list of items.

C. Phased Rendering

Figure 6:
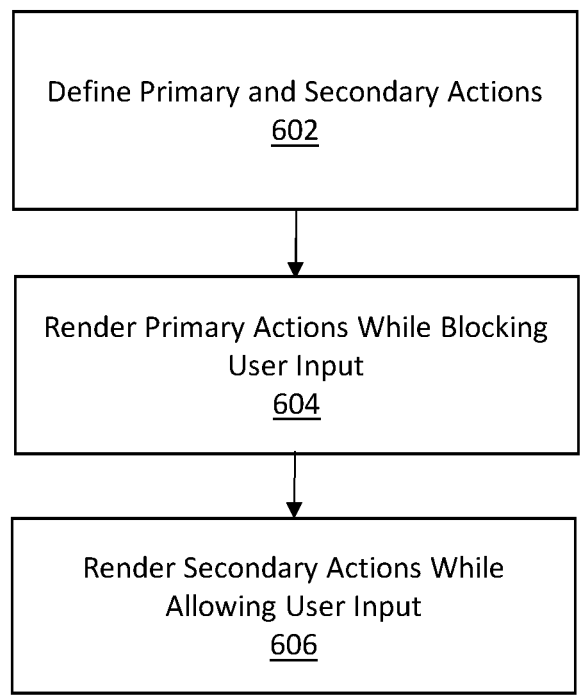
FIG. 6 illustrates an example set of operations for phased rendering.

FIG. 6 illustrates an example set of operations for rendering content in a phased manner. One or more operations illustrated in FIG. 6 may be modified, rearranged, or omitted altogether. Accordingly, the particular sequence of operations illustrated in FIG. 6 should not be construed as limiting the scope of one or more embodiments.

In an embodiment, the platform generator renders a particular subset of platform components, before rendering additional components. The platform generator defines primary (blocking) and secondary (nonblocking or asynchronous) actions. The platform generator renders the primary and secondary actions in phases. Phased rendering results in significantly reduced loading time, as compared to conventional rendering.

In an embodiment, the system defines primary actions and secondary actions (Operation 602). Primary and secondary action definitions may be received by the system via input from a user. As an example, a user may use a drop-down menu to define a particular action as primary or secondary. Alternatively, or additionally, the system may define primary and secondary actions. As an example, the system may determine the most efficient order in which to render UI components, based on the application metadata.

In an embodiment, the platform generator renders primary actions while blocking user input (Operation 604). The platform generator may block other rendering and user input until the steps of the primary action are complete. As an example, the platform generator prepares to render a series of tabs. The rendering of the first tab is defined as a primary action. The first tab is rendered. Additional tabs are not rendered. While the primary action is rendered, user input is blocked until the rendering steps of the primary action are complete. The first tab is rendered, along with associated transactional data and metadata describing the fields in the first tab. While the steps of rendering the first tab are being executed, the system prevents a user from interacting with the UI. For example, while a primary action is being rendered, the system does not permit a user to fill in any blanks in the UI until the steps in the primary action are complete. The platform generator blocks additional rendering until the steps of the primary action are complete, and a response is received. The platform generator merges the data. The platform interface is generated before initiating additional (secondary) actions.

In an embodiment, the platform generator renders secondary actions while allowing user input (Operation 606). The secondary actions are rendered in a nonblocking manner. The secondary actions may be rendered as batched server actions. The secondary actions may be rendered in a synchronous manner. The platform generator renders the platform interface. The platform generator updates the platform interface as actions are completed. The platform generator merges data, metadata, and messages. The platform generator replaces layout as needed.

As an example, rendering a second and third tab are defined as secondary actions, while rendering a first tab has been defined as a primary action. After the steps in rendering the first tab have been completed in a blocking manner, the second and third tabs are rendered in a nonblocking manner. While the steps are being executed to render the second and third tabs, the system permits a user to interact with the platform interface. A user is permitted to interact with a scroll bar and click buttons on the platform interface while the second and third tabs are being rendered.

Alternatively, or additionally, the system may execute paginated rendering. As an example, a list of 1,000 items is selected for display. The list is represented as tabular data. The platform generator renders a subset of the data corresponding to one page. The system detects a user click of a "next page" button. The platform generator retrieves the data corresponding to the next page and updates the rendered list to show different items.

D. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 7A:
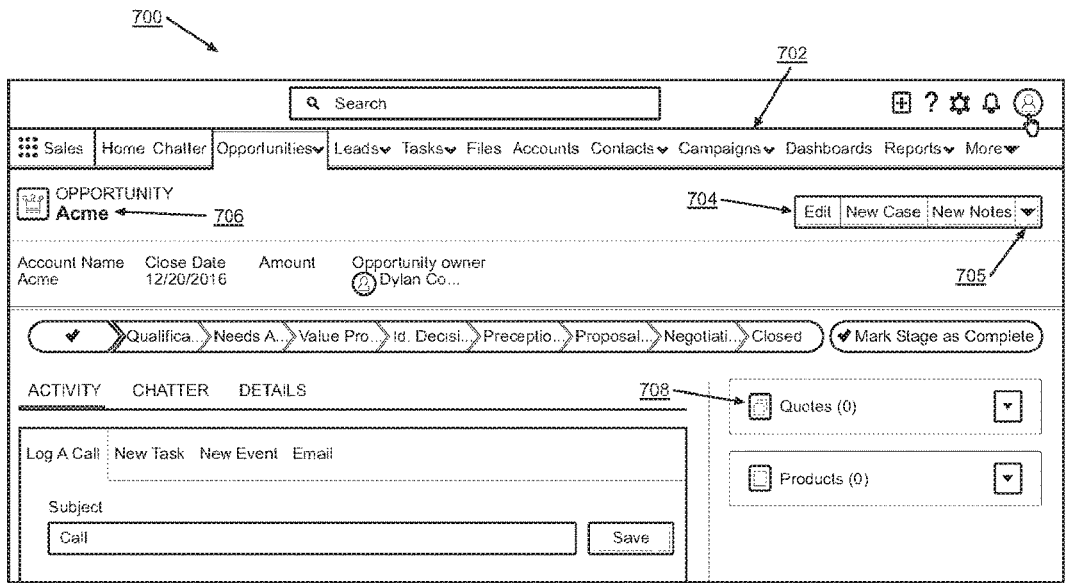

FIG. 7A illustrates an example platform interface 700. The platform interface 700 has a particular look and feel, including a colorful display. The platform interface 700 includes a tab list 702 comprising thirteen header elements. The header elements allow for site navigation and interaction. Some of the header elements are rendered as drop-down menus.

The platform interface 700 further includes a set of three buttons 704 displayed beside a drop-down menu. The buttons are labeled Edit, New Case, and New Note, respectively. The number of buttons 704 included in the button set is limited to three. A drop-down menu is included beside the buttons, to allow for additional functionality without cluttering the interface.

The platform interface 700 further includes an opportunity name 706. In this case, the opportunity name 706 is Acme. The opportunity name 706 is displayed alongside an orange icon.

The platform interface 700 includes a drop-down menu labeled "Quotes" 708. When a user interacts with the drop-down menu, several options are displayed, including "Create New Quote." Upon receiving user selection of the Create New Quote option, the platform interface transmits a request to a third-party application. The third-party application is used to create and manage quotes.

Figure 7B:
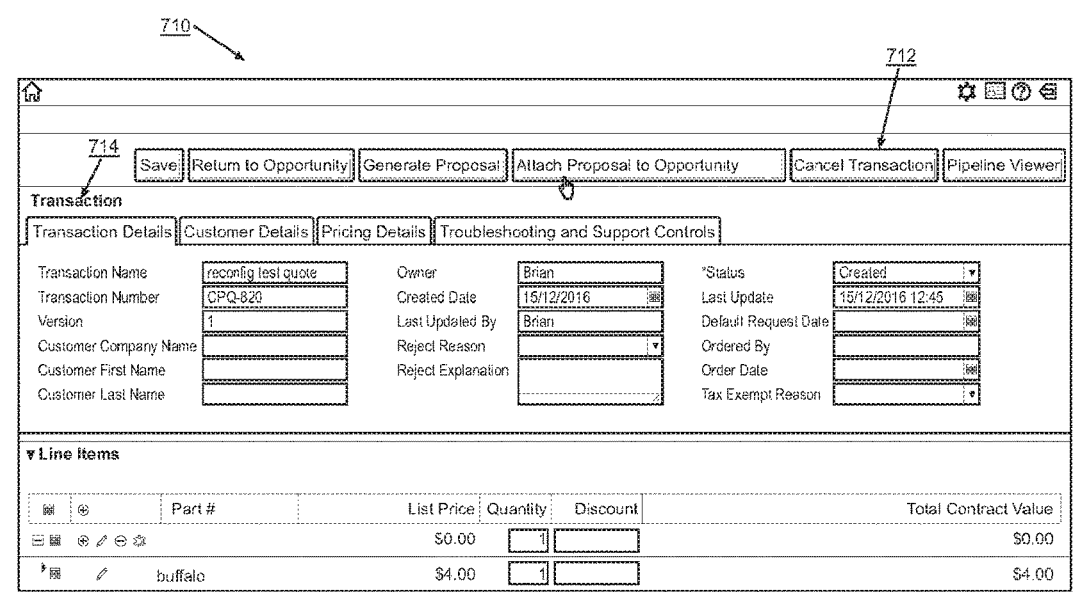

FIG. 7B illustrates an example third-party application interface 710. The third-party application interface 710 has a different look and feel than the platform interface 700. The third-party application interface 710 is displayed in greyscale. The third-party application interface 710 has a simple, boxy layout.

The third-party application interface 710 includes a set of six buttons 712. The buttons 712 are labeled Save, Return to Opportunity, Generate Proposal, Attach Proposal to Opportunity, Cancel Transaction, and Pipeline Viewer. Each button 712 corresponds to one or more actions executable by the third-party application.

The main area of the interface for generating a new transaction is labeled "Transaction" 714. The third-party application interface 710 includes a set of fields 716 for receiving user input related to the transaction.

Figure 7C:
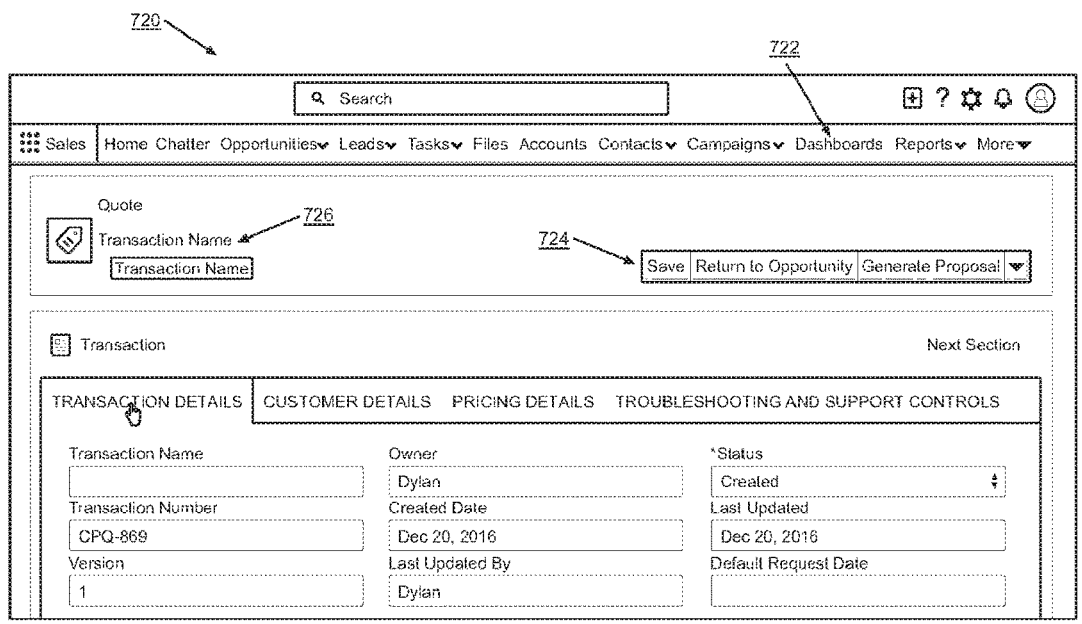
Figure 7D:
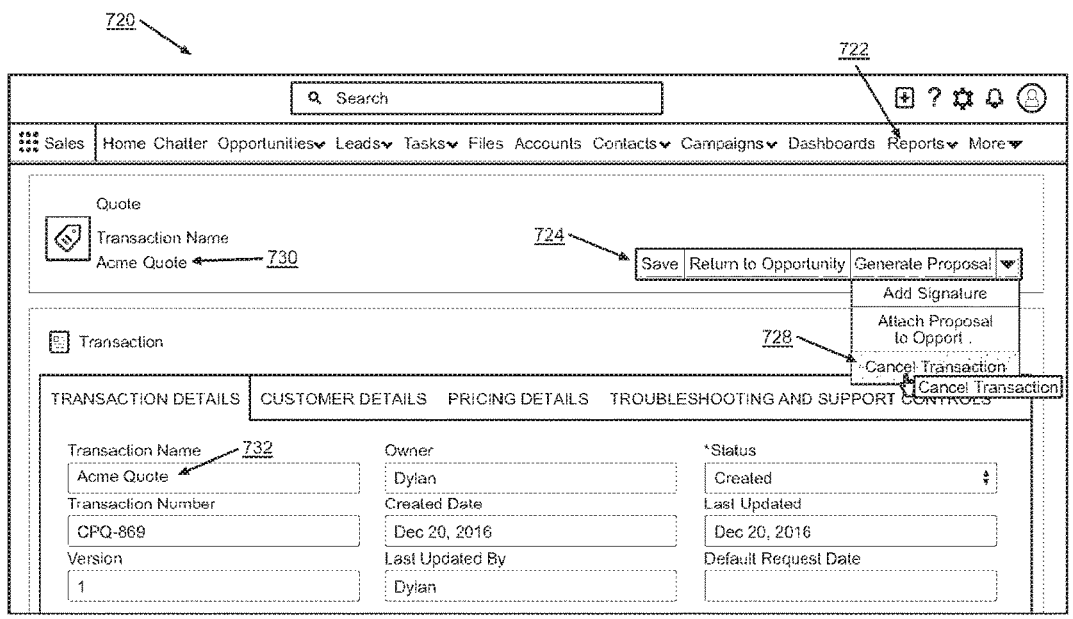

FIGS. 7C-7D illustrate an example platform interface integrating third-party application features 720 (hereinafter "integrated interface"). The integrated interface 720 retains the look and feel of the platform interface 700. The integrated interface 720 incorporates application features of the third-party application into the platform interface.

The integrated interface 720 includes a colorful display based on the display format of the original platform interface 700. The quote name is displayed next to a colorful icon 726, much like the opportunity name 706 is displayed next to a colorful icon in the platform interface 700. The integrated interface 720 includes a tab list 722. The tab list 722 includes the same thirteen elements as displayed in the tab list 702 of the original platform interface 700.

The integrated interface 720 includes a button set 724, which includes three buttons displayed with a drop-down menu. The button set 724 integrates the third-party application features corresponding to the six buttons 712 into the integrated interface 720. The button set 724 is displayed in accordance with metadata defining the look and feel of the platform interface. The button set 724 mimics the appearance of the three buttons 704 displayed via the original platform interface 700. However, the text displayed on the three buttons of button set 724 duplicates the text displayed on the button group 712 of the third-party application interface 710. FIG. 7D shows the activated drop-down menu 728. To maintain the simplified appearance of the button group 704 of the platform interface 700, three of the six third-party application features are hidden in the drop-down menu 728.

Responsive to detecting user interaction with the integrated interface 720, operations may be executed in the platform and/or the third-party application. As shown in FIG. 7C, the integrated interface 720 is initially rendered with a blank quote name 726. As shown in FIG. 7D, the integrated interface 720 has been updated to display the quote name, "Acme Quote" 730. The quote name has been specified via user input in the "Transaction Name" field 732. When the system receives the user input "Acme Quote," the text Acme Quote is displayed via the integrated interface 720, both in the Transaction Name field 732 and in the quote name section 730. Further, the text Acme Quote is stored to the third-party application as a value for the Transaction Name field.

Using the integrated interface, the user can seamlessly interact with the platform interface and the third-party application. The user need not realize that the user is interacting with any application other than the native platform.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
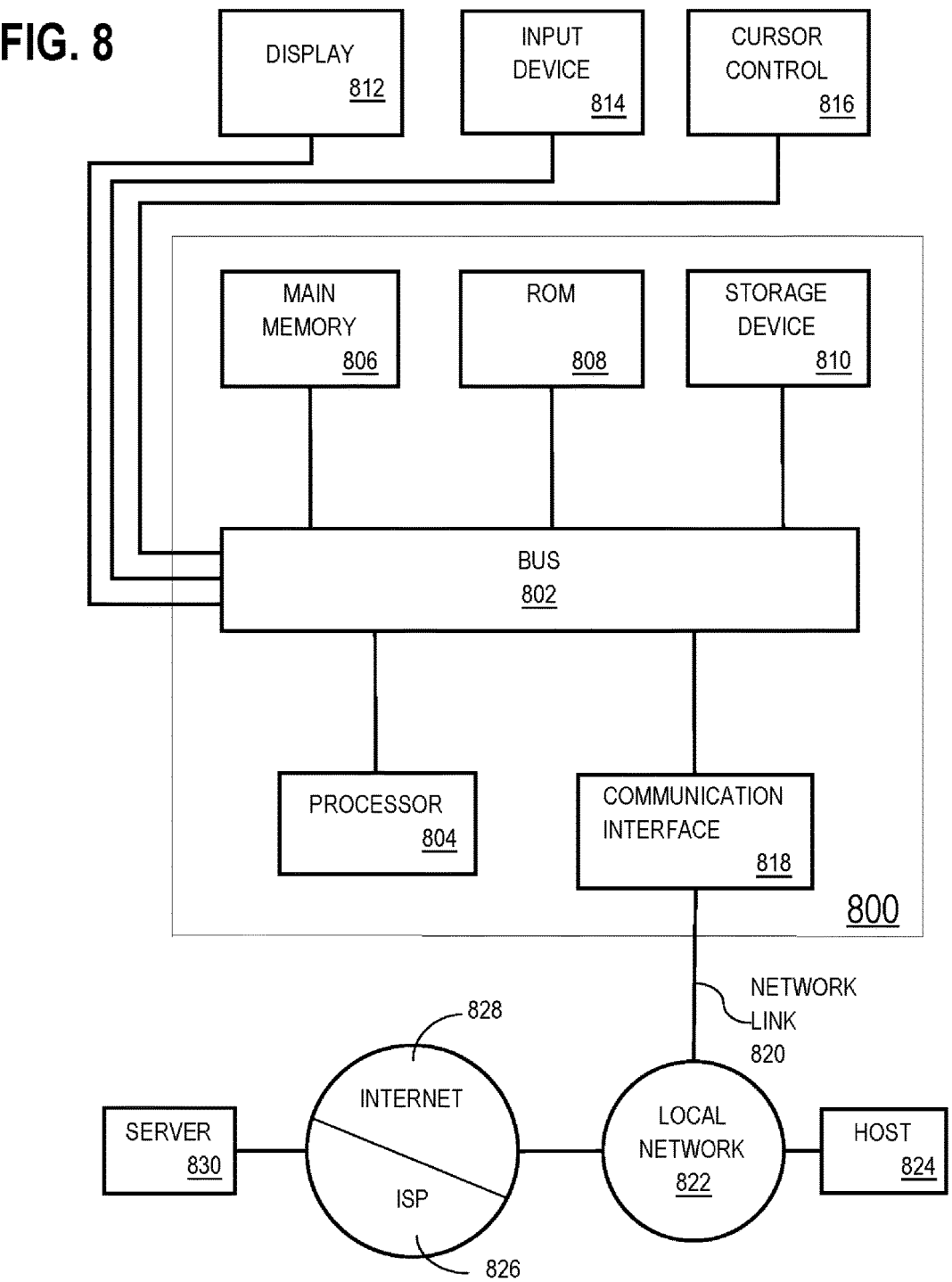
FIG. 8 illustrates a block diagram of a system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 650 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause:
   analyzing application metadata to determine application behavior of a set of application components of a third-party application interface corresponding to a third-party application;
   constructing platform components for a platform interface to integrate at least a portion of the third-party application into the platform interface, the platform components configured to replicate at least a portion of the application behavior corresponding to the set of application components of the third-party application interface;
   rendering a first subset of platform components, of said platform components, in a blocking state which prohibits user input until all of the first subset of platform components have been rendered within the platform interface;
   executing operations to display the platform interface comprising the platform components configured in accordance with the application behavior corresponding to the set of application components of the third-party application interface; and
   constructing and transmitting a request to the third-party application based on input received by the platform interface via the platform components.

2. The media of claim 1, wherein rendering a first subset of platform components further comprises:
   analyzing application metadata to determine rendering behavior defined for the set of application components of the third-party application interface; and
   adapting the platform interface to render the platform components in accordance with the rendering behavior defined for the set of application components of the third-party application interface.

3. The media of claim 1, wherein the operations further comprise:
   rendering a second subset of platform components, of said platform components, in a non-blocking state which does not prohibit user input until all of the second subset of platform components have been rendered within the platform interface.

4. The media of claim 1, wherein constructing the platform components comprises utilizing a native library of tools defined for the platform interface.

5. The media of claim 1, wherein the operations further comprise:
   receiving a response from the third-party application;
   extracting information from the response; and
   displaying the extracted information via the platform components of the platform interface.

6. The media of claim 1, wherein configuring the platform components to replicate at least the portion of the application behavior corresponding to the set of application components comprises:
   binding I/O of a platform component, of said platform components, to a data set corresponding to a respective application component of the set of application components.

7. The media of claim 1, wherein constructing the platform components comprises converting one type of element to another type of element.

8. The media of claim 1, wherein constructing the platform components comprises replicating a first portion of the application behavior without modification, and modifying a second portion of the application behavior based on platform behavior corresponding to the platform components of the platform interface.

9. The media of claim 1, wherein constructing the platform components comprises associating the set of application components of the third-party application interface with actions, wherein the actions modify the platform interface.

10. The media of claim 1, wherein constructing the platform components comprises modifying a second portion of the application behavior based on restrictions of the platform interface.

11. A method comprising:
analyzing application metadata to determine application behavior of a set of application components of a third-party application interface corresponding to a third-party application;
constructing platform components for a platform interface to integrate at least a portion of the third-party application into the platform interface, the platform components configured to replicate at least a portion of the application behavior corresponding to the set of application components of the third-party application interface;
rendering a first subset of platform components, of said platform components, in a blocking state which prohibits user input until all of the first subset of platform components have been rendered within the platform interface;
executing operations to display the platform interface comprising the platform components configured in accordance with the application behavior corresponding to the set of application components of the third-party application interface; and
constructing and transmitting a request to the third-party application based on input received by the platform interface via the platform components;
wherein the method is performed by at least one device including a hardware processor.

12. A method comprising:
analyzing application metadata to determine application behavior of a set of application components of a third-party application interface corresponding to a third-party application;
constructing platform components for a platform interface to integrate at least a portion of the third-party application into the platform interface, the platform components configured to replicate at least a portion of the application behavior corresponding to the set of application components of the third-party application interface;
rendering a second subset of platform components, of said platform components, in a non-blocking state which does not prohibit user input until all of the second subset of platform components have been rendered within the platform interface;
executing operations to display the platform interface comprising the platform components configured in accordance with the application behavior corresponding to the set of application components of the third-party application interface; and
constructing and transmitting a request to the third-party application based on input received by the platform interface via the platform components;
wherein the method is performed by at least one device including a hardware processor.

13. One or more non-transitory machine-readable media storing instructions which, when executed by one or more hardware processors, cause:
analyzing application metadata to determine application behavior of a set of application components of a third-party application interface corresponding to a third-party application;
constructing platform components for a platform interface to integrate at least a portion of the third-party application into the platform interface, the platform components configured to replicate at least a portion of the application behavior corresponding to the set of application components of the third-party application interface;
rendering a second subset of platform components, of said platform components, in a non-blocking state which does not prohibit user input until all of the second subset of platform components have been rendered within the platform interface; executing operations to display the platform interface comprising the platform components configured in accordance with the application behavior corresponding to the set of application components of the third-party application interface; and
constructing and transmitting a request to the third-party application based on input received by the platform interface via the platform components.

* * * * *